United States Patent
Biswas et al.

(10) Patent No.: US 9,299,075 B2
(45) Date of Patent: Mar. 29, 2016

(54) METHOD AND SYSTEM FOR ACTIVATING A SOFTWARE APPLICATION WHILE PROVISIONING SERVICES FOR THE APPLICATION

(75) Inventors: Sanjeev Kumar Biswas, Ghaziabad (IN); Akash Jain, Uttar Pradesh (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1463 days.

(21) Appl. No.: 12/622,047

(22) Filed: Nov. 19, 2009

(65) Prior Publication Data

US 2014/0032350 A1   Jan. 30, 2014

(51) Int. Cl.
G06Q 30/00 (2012.01)
G06F 17/30 (2006.01)
G06Q 30/06 (2012.01)
G06F 21/12 (2013.01)

(52) U.S. Cl.
CPC ............ *G06Q 30/018* (2013.01); *G06F 21/125* (2013.01); *G06Q 30/06* (2013.01); *G06F 2221/0704* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 2006/0059571 A1* | 3/2006 | Chen et al. ...................... | 726/29 |
| 2008/0096507 A1* | 4/2008 | Erola .......................... | 455/187.1 |
| 2008/0183625 A1* | 7/2008 | Onders ............................ | 705/59 |
| 2008/0228513 A1* | 9/2008 | McMillan et al. ................. | 705/1 |
| 2009/0205055 A1* | 8/2009 | Savov ............................. | 726/31 |

OTHER PUBLICATIONS

Brocade announces new products and capabilities to address broad IT systems requirements. (May 31, 2005). PR NewswireRetrieved from http://search.proquest.com/docview/446947860?accountid=14753.*

* cited by examiner

*Primary Examiner* — Kathleen Palavecino
(74) *Attorney, Agent, or Firm* — Shook Hardy & Bacon L.L.P.

(57) ABSTRACT

Methods and systems for activating a software application while provisioning a web service to operate with the software application are described. Consistent with some embodiments, a product activation procedure is performed during a workflow to provision a web service to operate with a software application. By activating the software application during the web service provisioning workflow, an end-user can establish ownership of a proper license for the software application without having to input any license information, such as a serial number or product key, associated with the end-user's license.

14 Claims, 3 Drawing Sheets

METHOD AND SYSTEM FOR ACTIVATING A SOFTWARE APPLICATION WHILE PROVISIONING SERVICES FOR THE APPLICATION

TECHNICAL FIELD

The present disclosure generally relates to End User Licensing Agreements (EULA's) and software activation techniques. More specifically, the present disclosure relates to computer-based methods and systems for activating a software application while provisioning a service (e.g., a web service) for use with the software application.

BACKGROUND

To protect against unauthorized copying and use of software applications, many software vendors utilize some form of product activation procedure. In general, product activation (sometimes referred to as software activation) involves a procedure for verifying the authenticity of a software product, and ensuring that the software product is used within the scope of its end-user license agreement (EULA). In a typical product activation procedure, when an installed software application is executed for the first time, the software application performs a license verification procedure to determine whether it has been properly licensed and activated. If not, a user is typically prompted to enter some product activation information that is associated with a license, such as a serial number or product key. The product activation information, which is often referred to as license information (e.g., serial number or product key), is communicated along with a machine signature that identifies the machine on which the software has been installed to a backend license server. The backend license server verifies that the received license information corresponds with license information stored at the license server, and then generates a record in a license database to indicate that the software application has been installed and activated on the particular machine identified by the machine signature. Requiring an end-user to input license information in order to activate a software application is an inconvenience to the end-user. Entering a long alphanumeric string is both time consuming and prone to user error, often resulting in frustration for the end-user.

DESCRIPTION OF THE DRAWINGS

Some embodiments are illustrated by way of example and not limitation in the figures of the accompanying drawings, in which.

DETAILED DESCRIPTION

Figure 1:
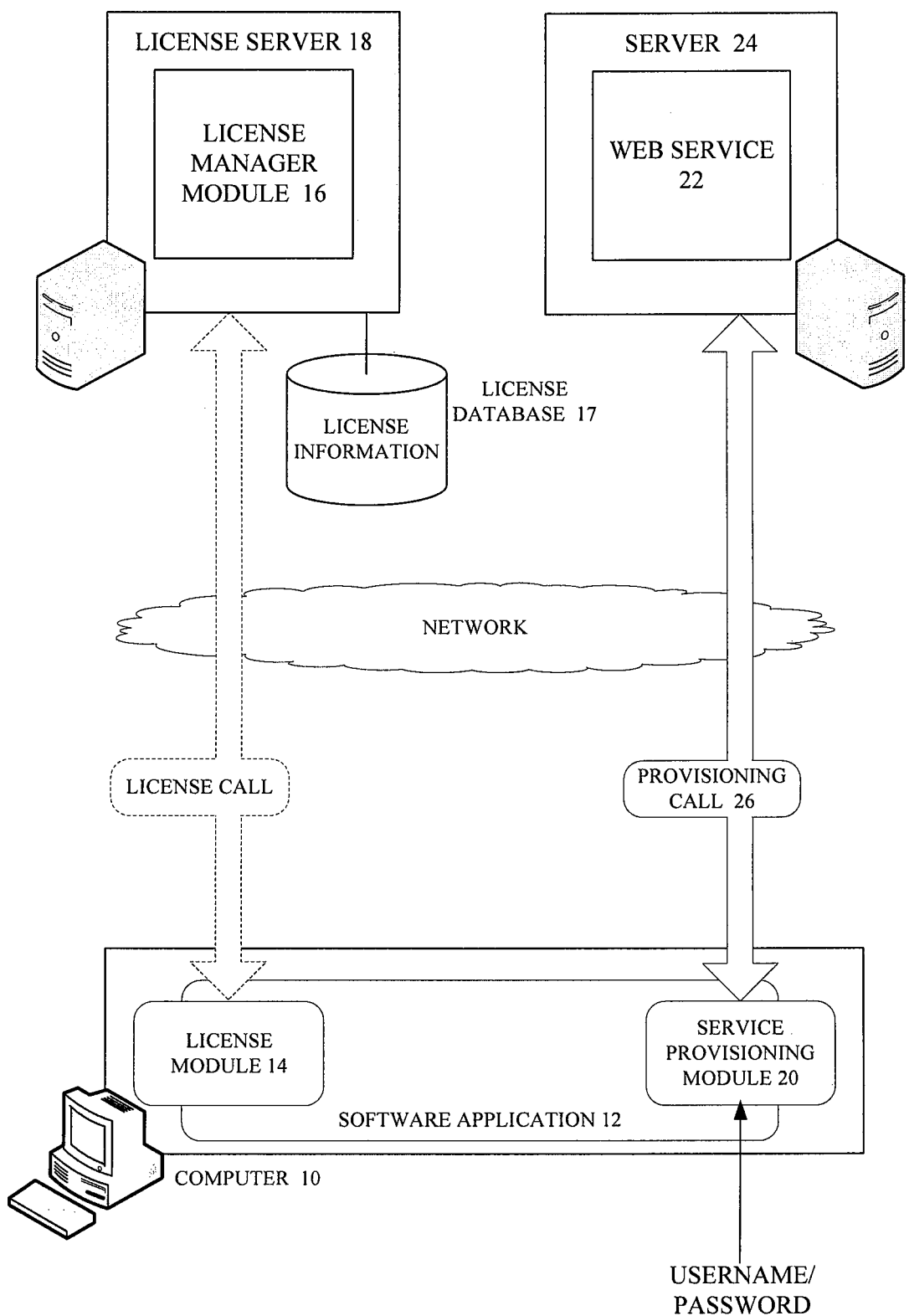
FIG. 1 illustrates a functional block diagram of the modules involved in a product activation scheme in which licensing information is verified during a workflow to provision a web service to operate in conjunction with a desktop software application, according to an embodiment of the invention.

Methods and systems for activating a software application while provisioning a service, such as a web service, for use with the software application are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

As used herein, the term "web service" (sometimes referred to as "webservice") is a service, software system, application, module or component designed to support interoperable machine-to-machine interaction over a network. A web service has an interface described in a machine-processable format (e.g., Web Services Description Language WSDL). Other applications and/or systems interact with a web service in a manner prescribed by its description using messages (e.g., Simple Object Access Protocol (SOAP) messages), typically conveyed using the Hypertext Transfer Protocol (HTTP) with an eXtensible Markup Language (XML) serialization in conjunction with other web-related standards. Web services are frequently just Internet Application Programming Interfaces (API) that can be accessed over a network, such as the Internet, and executed on a remote system hosting the requested services.

According to some embodiments of the invention, a product activation procedure is performed during a workflow to provision a service, such as a web service, to operate with a software application. By activating the software application during the web service provisioning workflow, an end-user can establish ownership of a proper license for the software application without having to input any license information, such as a serial number or product key, associated with the end-user's license. Moreover, by combining the product activation and web service provisioning operations into a single workflow, the amount of time required to properly configure and set-up the software application is significantly reduced.

In some embodiments, the product activation procedure enables a user to activate the software application without requiring the end-user to enter any license information, such as a long serial number or product key, at the computer on which the software application is installed. This is made possible in a number of different scenarios. For instance, after executing a software application for the first time and during the web service provisioning process, an end-user may be prompted to purchase a license if the end-user does not already own a license to use the software application. The purchase may be facilitated by the end-user submitting various information, including payment information and end-user authentication information (e.g., username and password), via one or more web-based forms. After purchasing the license, at the backend license server the license information (e.g., serial number or product key) can be automatically linked or associated with the end-user's authentication information and the machine signature on which the software application is installed. In contrast to many conventional product activation processes, which send the license information to the end-user via email, the end-user will not be prompted to enter the license information because it is associated with the end-user and stored at the backend license server when purchased during the web service provisioning operation.

In another scenario, if the end-user has previously purchased a license for the software application, for example, at the time the software application was initially downloaded from the software developer's server, the license information associated with the license can be identified during the web service provisioning operation without prompting the end-user to enter the license information. For example, when the end-user enters end-user authentication information (e.g., a username and password) to authenticate with the remote server during the web service provisioning process, the username and password can be forwarded to a backend license server and used by the license server to establish that the end-user has previously purchased a license for the desktop application. After verifying the license information at the license server, the license status of the software application is communicated to the software application where it can be stored locally, and used to locally verify the license status of the software application during subsequent invocations of the software application.

In yet another scenario, a user may be re-installing a previously installed software application, for example, after having upgraded or re-installed an operating system. Because the software application had previously been installed on the computer, the license server already has recorded the license information and associated the license information with the end-user's authentication information and the machine signature for the particular computer on which the software application is being re-installed. Accordingly, during the web service provisioning operation, when the user provides user authentication information (e.g., username and password), the backend license server can verify that the license had previously been properly validated, and that the software application had previously been activated. Accordingly, during the web service provisioning process, the license status of the software application can be updated at the computer on which the software application is installed, without requiring the end-user to re-enter the license information at the computer system on which the software application is installed. Other aspects of the inventive subject matter will become readily apparent from the description of the figures that follow.

FIG. 1 illustrates a functional block diagram of the modules involved in a product activation scheme in which product activation occurs during a workflow to provision a web service to operate with a software application, according to an embodiment of the invention. As illustrated in FIG. 1, a user computer 10 is shown to include an installed desktop software application 12. The application 12 includes, or is operable to utilize, a license module 14 capable of performing various license calls to a remote license manager module 16 on a remote license server 18. In addition, the software application 12 includes, or is operable to utilize, a web service provisioning module 20 to provision a web service 22 residing and executing on a remote server 24 for use with the application 12. Consistent with embodiments of the invention, the activation of the software application 12 is achieved using the web service provisioning module 20 while performing a workflow to provision the web service 22 for use with the desktop software application. Consequently, in some embodiments, the license module 14 need not prompt the end-user for license information, or make any remote license calls to the license server 18, in order to activate the software application. Instead, the exchange of data occurs via the service provisioning module 20.

In some embodiments of the invention, when the application 12 has not yet been activated and is executed for the first time, the application 12 will prompt the end-user to provision the web service 22 on the remote server 24. Provisioning the web service 22 involves, at a minimum, prompting the end-user to provide existing authentication information (e.g., username and password), or to generate new end-user authentication information. Depending upon the specific nature of the desktop software application 12 and the web service 22, a variety of other configuration settings may be requested from the end-user, or automatically gathered by analyzing various aspects of the computer system 10 and network to which the computer system 10 is connected. In some embodiments, the web service 22 may provide a network-based storage and collaboration service, allowing files to be commonly accessed by a group of end-users using certain software applications. In other embodiments, the web service 22 may provide some other specific data processing function.

In any case, once the end-user has provided his or her authentication information, a web service provisioning call 26 is communicated by the service provisioning module 20 to the web service 22 at the remote server 24. In some embodiments, the web service provisioning call 26 includes, among other items of information, the end-user-entered authentication information, a machine signature identifying the machine on which the desktop software application has been installed, and product information such as a product identifier to identify the desktop software application for which the web service 22 is being provisioned. When the web service 22 receives the web service provisioning call 26, the web service 22 processes the web service provisioning call 26 by first ensuring that the desktop software application 12 is, or can be, licensed and activated. Accordingly, some or all of the information included in the web service provisioning call 26 received at the web service 22 is communicated to a license manager module 16 on a backend license server 18. The license server 18 uses the received information to determine whether the end-user has previously purchased a license for the desktop application 12. If an existing license for the software application 12 identified by the product identifier is already associated with the machine signature identifying the computer system 10 on which the software application 12 is installed, the license information for the software application 12 is simply communicated to the computer system 10 on which the software application is installed. This may be the case, for example, when the software application 12 has been reinstalled after performing an operating system upgrade, or some other software or system upgrade. Alternatively, the backend license server 18 may have a record indicating one or more licenses for the software application 12 are available to the end-user, but not yet associated with the particular machine signature. This may be the case, for example, when multiple licenses are purchased for several individual computers. In this scenario, license information is generated and linked to the machine signature and end-user authentication information before being stored in the license database 17, and communicated back to the software application 12 at the computer system. In some embodiments, the license information (e.g., serial number or product key) for the desktop software application 12 is communicated back to the web service 22, which communicates or forwards the information to the desktop software application 12 where it is stored in a license database (not shown).

If no existing license information for the desktop application 12 can be found in the license database 17 of the license server 18, the end-user may be prompted to purchase a license for the desktop application 12. Accordingly, the end-user will be prompted to enter payment information for the purchase of the license for the software application 12. After processing the transaction, the license information associated with the license will automatically be generated and stored at the license server 18, and the license information will be communicated back to the desktop software application 12 where it can be stored in a license database (not shown).

Once the software application 12 has received valid license information for the software application, a license validation process is performed to activate the software application, or certain licensed features of the software application. During the activation process, the license information for the software application is communicated to the license server and validated. The license server updates the license information associated with the machine signature and end-user authentication information to reflect the activated status. Upon successful validation of the license information, a response message is communicated back to the software application 12 to indicate that the software application 12 has successfully been activated. Accordingly, the software application 12 updates its license status in a license database, and unlocks any license-dependent features. Moreover, any additional processing operations required to provision the web service are then completed. In some embodiments, the request to activate the software application may be communicated in a provisioning call 26 via the service provisioning module. Alternatively, in some embodiments, the activation request may be communicated automatically and transparent to the end-user in a separate license call via the license module 14.

Figure 2:
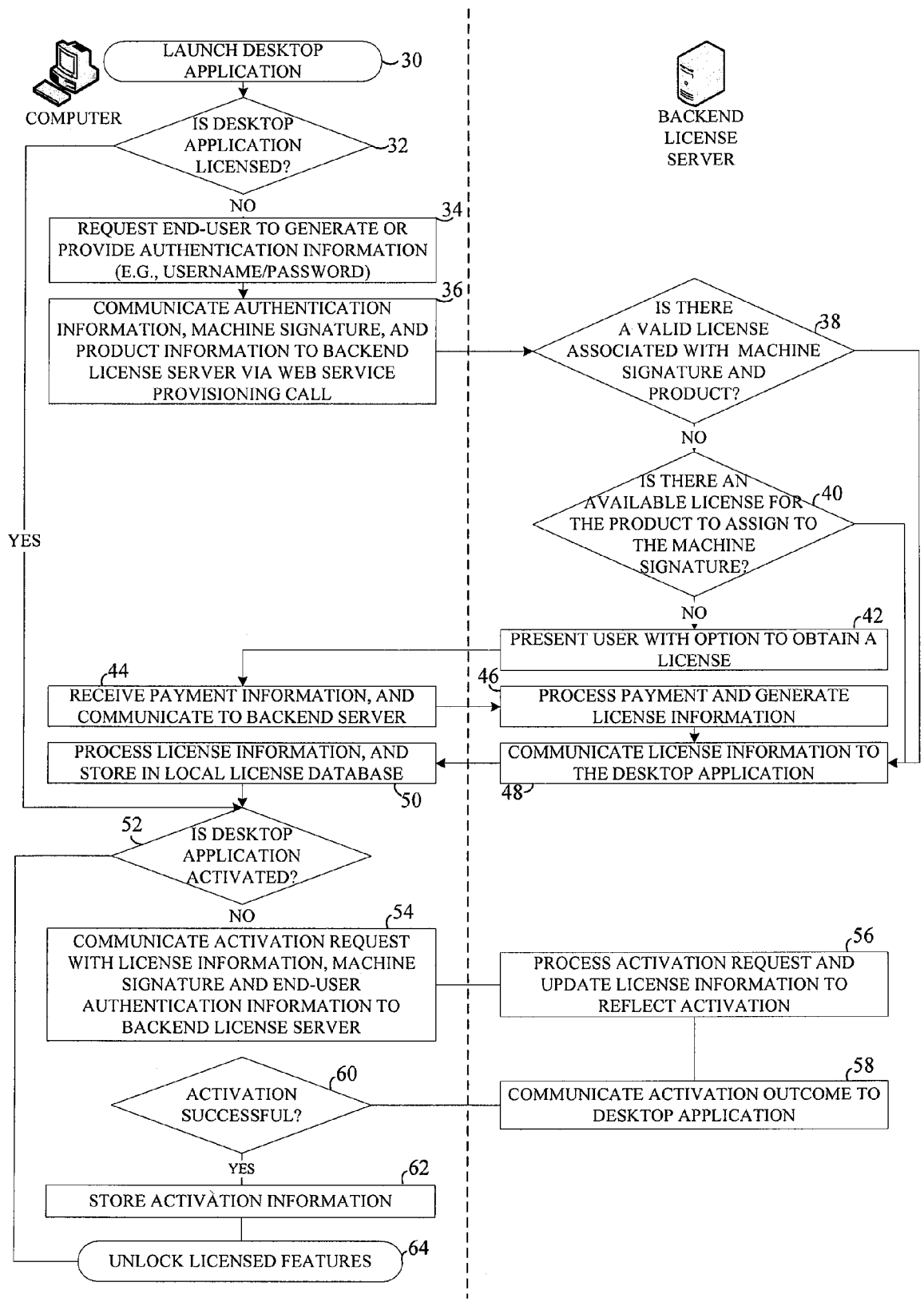
FIG. 2 illustrates a method for activating a desktop software application while performing a workflow to provision a web service on a remote server to work with the desktop software application, according to an embodiment of the invention.

FIG. 2 illustrates a method for activating a desktop software application while performing a workflow to provision a web service to work with the desktop software application, according to an embodiment of the invention. As illustrated in FIG. 2, the method begins at method operation 30 when the desktop software application is invoked for the first time. When the application is initially launched, at method operation 32 the application determines whether the application is currently licensed—that is, has a valid license for the particular software application. This may involve, for example, performing a lookup operation in a license database to determine if a valid serial number exists in a record that is associated with a product identifier for the particular software application. If a valid serial number does exist, the software application attempts to determine whether the application has been activated, for example, by having had its license information validated with a backend license server. However, if no license information exists in the license database for the software application, at method operation 34 a web service provisioning module is invoked to, among other things, provision a web service for use with the software application. In addition to provisioning the web service for use with the software application, the web service provisioning module will attempt to retrieve existing license information for the software application, and activate the software application with the license information. Accordingly, the web service provisioning module prompts the end-user to provide existing authentication information, such as a username and password, or alternatively, the end-user may be prompted to generate a new username and password for use with the web service.

At method operation 36, the end-user-supplied authentication information is communicated in a web service provisioning call to a web service executing at a remote server. In addition to the authentication information, the web service provisioning call may also include a machine signature that uniquely identifies the machine or computer system on which the software application is installed, and a product identifier that identifies the software application for which the web service is being provisioned for use.

The web service provisioning call is received at the web service and processed. Certain information included in the web service provisioning call is forwarded to the backend license server. Accordingly, at method operation 38, the backend license server uses the received end-user authentication information, machine signature and product identifier to determine whether an existing license has been granted to the end-user for the software application executing on the machine identified by the machine signature. For example, the authentication information, machine signature and product identifier may be used in a database lookup operation to identify an existing record indicating an existing license for the software application is already linked to the machine signature for the particular end-user. If an existing license for the software application is already linked to the machine signature, then at method operation 48, the existing license information is communicated to the software application. In some instances, the license information may be encrypted before being sent to the computer system on which the software application is installed and executing.

If at method operation 38 no existing license information can be found for the particular machine signature, then at method operation 40 the license server determines whether an available license for the software application exists. For example, the license server may perform a database lookup operation against the license database to determine whether a record exists for the end-user (based on the provided authentication information, or other personal information provided by the end-user) and indicates one or more previously purchased licenses are available for the software application. If so, the machine signature is linked to the license information and stored in the license database, and then the license information is communicated to the software application on the computer. However, if no licenses for the software application are available, then at method operation 42 the user may be presented with an option to obtain (e.g., purchase) a license to use the software application. Accordingly, at method operation 44, the end-user may provide payment information via a user interface facilitated by the software application, which is then communicated to the backend license server. At method operation 46, the backend license server receives the payment information, processes the payment, and generates the license information for the machine signature of the machine on which the software application is installed. At method operation 48, the license information is communicated to the software application executing at the computer system, where, at method operation 50 the license information is processed (e.g., decrypted) and stored in a license status database.

Next, at method operation 52, the software application determines whether or not it has been activated. For example, the software application may analyze a license status database to determine whether a record exists that indicates the software application has had its license information validated by a backend license server, and is therefore activated. If not, the software application communicates an activation request to the backend license server at method operation 54. The activation request includes at a minimum, the license information. In some embodiments, because the backend license server already has associated the license information with the end-user and machine signature, no other information is required in the activation request. Alternatively, in some embodiments, the end-user authentication information and machine signature for the computer may be communicated with the activation request. In some embodiments, the activation request is communicated directly to the license server via a license module, while in other embodiments, the activation request is encapsulated within a web service provisioning call and communicated by a service provisioning module to a web service. When received at the web service, the activation request is then forwarded to the license server.

At method operation 56, the backend license server receives and processes the activation request, for example, by verifying the received license information against license information stored in a license database. At method operation 58, the backend license server communicates the activation outcome to the software application. At method operation 60, the software application determines whether the activation request was successfully processed, and if so, stores the activation information at method operation 62 in a license status database. For example, the software application may update the license status of the software application in the license status database to reflect the successful activation of the software application. Finally, at method operation 64 the licensed features of the software application, which are dependent upon the software application being activated, are unlocked and made available for use by the end-user.

It will be appreciated by those skilled in the art that the various method operations may be modified in some manner without departing from the overall spirit and scope of the inventive subject matter. In particular, one or more method operations may be performed in an order different from what is illustrated in FIG. 2, or in some cases omitted, without departing from the scope and spirit of the inventive subject matter. Furthermore, the various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 3:
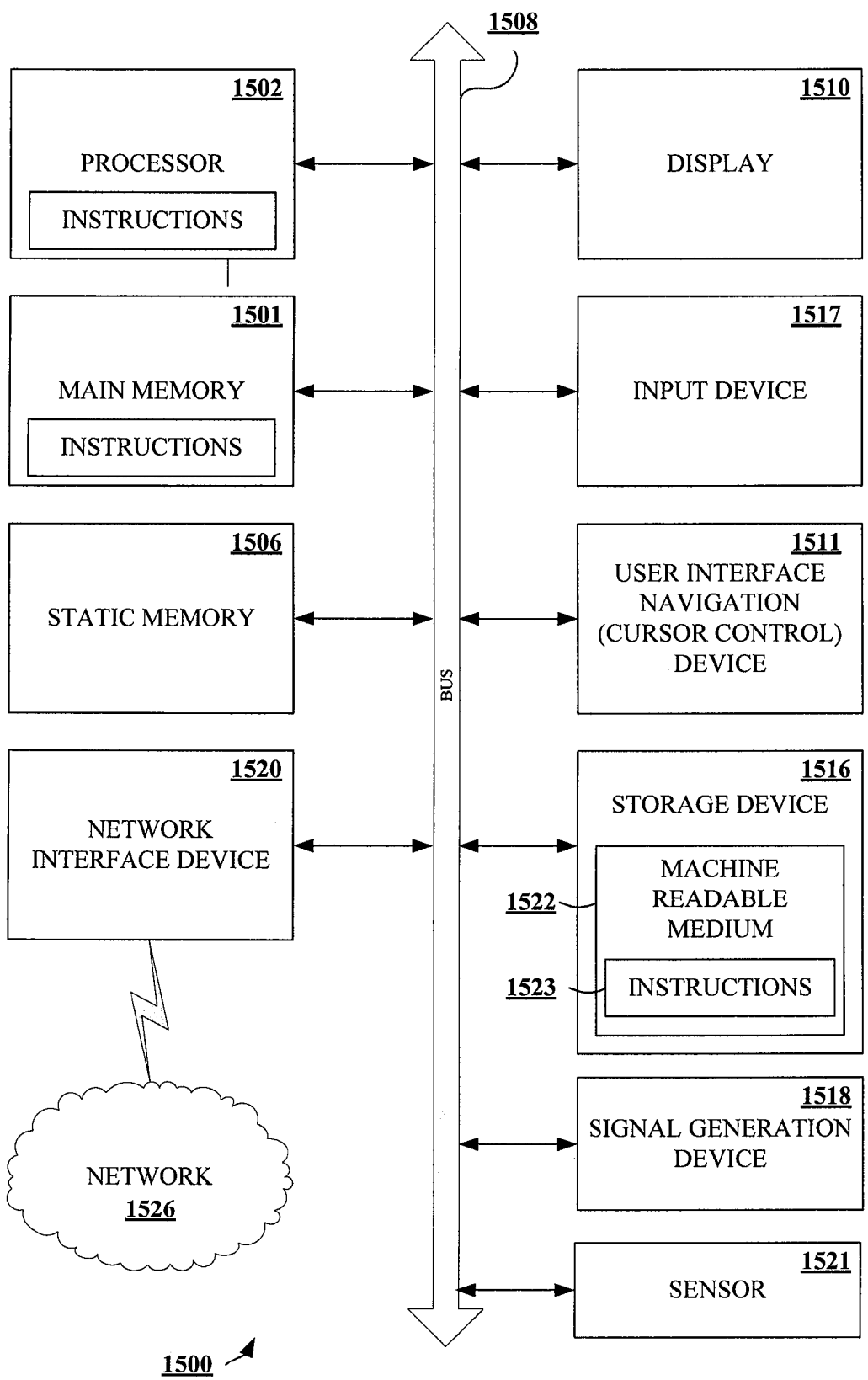
FIG. 3 is a block diagram of a machine in the form of a computer system within which a set of instructions, for causing the machine to perform any one or more of the methodologies discussed herein, may be executed.

FIG. 3 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A computer-implemented method comprising:
communicating a web service provisioning call to a web service executing on a first server computer, the web service provisioning call for provisioning the web service for use with a software application and performing a product activation operation, the web service provisioning call including user authentication information, a machine signature, and a product identifier identifying the software application installed on a computer system identified by the machine signature;
subsequent to communicating the web service provisioning call to the web service, receiving license information associated with a license for the software application from the web service executing on the first server computer;
communicating an activation request to a license manager module executing on a second server computer, the activation request including the license information associated with the license for the software application; and
receiving an indication from the license manager module executing on the second server computer that the software application has been activated.

2. The method of claim 1, the method further comprising:
receiving an indication from the web service that the web service has been provisioned for use with the software application.

3. The method of claim 1, further comprising:
after receiving the indication from the license server that the software application has been activated, enabling functionality of the software application that is dependent upon the software application being activated.

4. The method of claim 1, wherein the license information is received from a license server as a result of the license server having verified that an existing license exists for the software application for use on the computer system identified by the machine signature.

5. The method of claim 1, wherein the license information is received from a license server as a result of the license server having verified that an existing license, not yet associated with the computer system identified by the machine signature, is available to the end-user.

6. The method of claim 1, further comprising:
prior to receiving license information associated with a license for the software application, prompting for payment information for purchasing the license for the software application.

7. The method of claim 1, further comprising:
after receiving an indication from the license server that the software application has been activated, updating a license status database to indicate the software application has been activated.

8. A processing system, comprising:
at least one processor; and
a machine-readable medium in communication with the at least one processor, the machine readable medium storing a software application having a web service provisioning module that is executable by the at least one processor, the web service provisioning module being executable by the at least one processor to cause operations to be performed, the operations comprising:
communicating a web service provisioning call to a web service executing on a first server computer, the web service provisioning call to provision the web service for use the software a cation and including end-user authentication information, a machine signature, and a product identifier identifying a software application installed on a computer system identified by the machine signature;
subsequent to communicating the web service provisioning call, receiving license information associated with a license for the software application from the web service executing on the first server computer;
communicating an activation request to a license manager module executing on a second server computer, the activation request including the license information associated with the license for the software application; and
receiving an indication from the license manager module executing on the second server computer that the software application has been activated.

9. The processing system of claim 8, wherein the web service provisioning call is to provision the web service for use with the software application, and the web service provisioning module is to receive an indication from the web service that the web service has been provisioned for use with the software application.

10. The processing system of claim 8, wherein the operations further comprise:
after receiving the indication from the license server that the software application has been activated, enabling functionality of the software application that is dependent upon the software application being activated.

11. The processing system of claim 8, wherein the license information is received from a license server as a result of the license server having verified that an existing license exists for the software application for use on the computer system identified by the machine signature.

12. The processing system of claim 8, wherein the license information is received from a license server as a result of the license server having verified that an existing license, not yet associated with the computer system identified by the machine signature, is available to the end-user.

13. The processing system of claim 8, further comprising:
prior to receiving license information associated with a license for the software application, prompting a user to provide payment information for purchasing the license for the software application.

14. The processing system of claim 8, further comprising:
after receiving an indication from the license server that the software application has been activated, updating a license status database to indicate the software application has been activated.

* * * * *

UNITED STATES PATENT AND TRADEMARK OFFICE
CERTIFICATE OF CORRECTION

PATENT NO. : 9,299,075 B2
APPLICATION NO. : 12/622047
DATED : March 29, 2016
INVENTOR(S) : Sanjeev Kumar Biswas et al.

Page 1 of 1

It is certified that error appears in the above-identified patent and that said Letters Patent is hereby corrected as shown below:

In the Claims

Col. 10, Line 14: Add the word "by" after the words "for use"; after the word "software" replace the words "a cation" with "application."

Signed and Sealed this
Sixteenth Day of August, 2016

Michelle K. Lee
*Director of the United States Patent and Trademark Office*